Jan. 31, 1967   M. C. LAYLAND   3,302,155
TRIMMER POTENTIOMETER
Original Filed Nov. 5, 1962   2 Sheets-Sheet 1
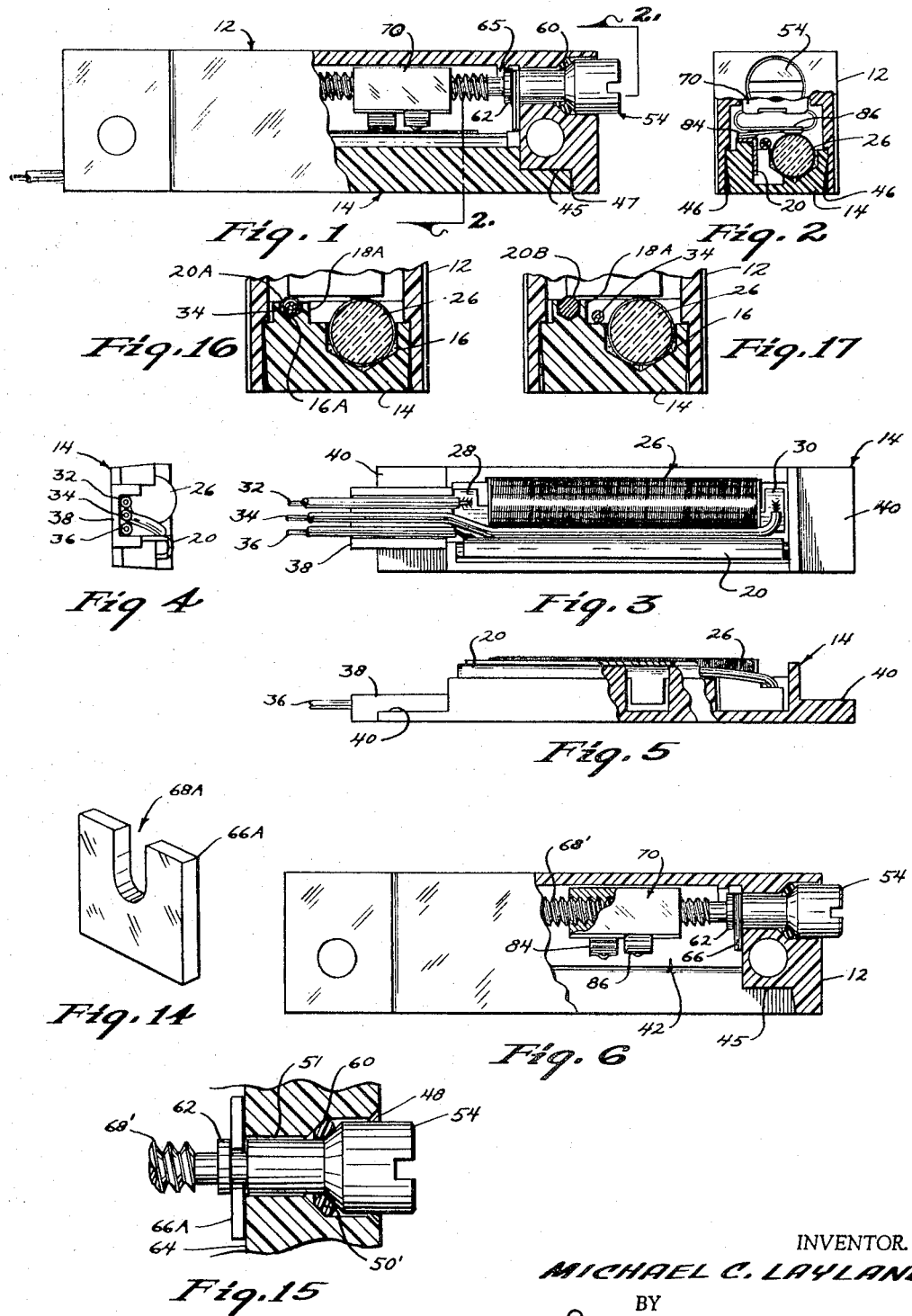
INVENTOR.
MICHAEL C. LAYLAND
BY
Dick, Zarley, McKee & Thomte
ATTORNEYS
WITNESS
NORMAN G. TRAVISS Jan. 31, 1967 M. C. LAYLAND 3,302,155
TRIMMER POTENTIOMETER
Original Filed Nov. 5, 1962 2 Sheets-Sheet 2

INVENTOR.
MICHAEL C. LAYLAND
BY
Dick, Zarley, McKee + Thomte
ATTORNEYS

WITNESS
NORMAN G. TRAVISS

United States Patent Office 3,302,155
Patented Jan. 31, 1967

3,302,155
TRIMMER POTENTIOMETER
Michael C. Layland, Diamond Bar, Calif., assignor to Dale Electronics, Inc., Columbus, Nebr., a corporation of Nebraska
Original application Nov. 5, 1962, Ser. No. 235,575, now Patent No. 3,233,201, dated Feb. 1, 1966. Divided and this application Jan. 25, 1966, Ser. No. 522,952
7 Claims. (Cl. 338—183)

This application is a divisional application of my co-pending application Serial Number 235,575 filed November 5, 1962, now issued into United States Patent No. 3,233,201 dated February 1, 1966.

The mass production of miniature trimmer potentiometers has invited a host of problems in fabrication and assembly of parts therefor. My invention relates to a trimmer potentiometer that is easily adaptable to mass production, and one that is capable of achieving maximum performance standards.

A principal object of my invention is to provide a trimmer potentiometer which has an easily fabricated wiper arm assembly that will provide constant uniform contact with the related components without causing any damage thereto.

A further object of my invention is to provide a trimmer potentiometer wherein the wiper arm assembly provides clearance whereby maximum travel of the assembly can be achieved.

A still further object of my invention is to provide a trimmer potentiometer wherein the wiper arms are easily secured to the wiper block.

A still further object of my invention is to provide a trimmer potentiometer wherein the wiper arm for the collector bar and the wiper arm for the resistance coil are comprised of a single piece of material.

A still further object of this invention is to provide a trimmer potentiometer wherein the standard components thereof are mounted in one part of the housing and the components which normally vary in design are separately constructed in a second part of the housing so that the two housings and components therefor can be mass produced separately and then later combined to create a plurality of potentiometers of varying design capabilities.

A still further object of my invention is to provide a trimmer potentiometer that can be easily detachably assembled for testing before becoming permanently assembled.

A still further object of this invention is to provide a trimmer potentiometer wherein the resistance coil is self-aligned regardless of the amount of windings thereon.

A still further object of my invention is to provide a trimmer potentiometer that is easily sealed and which is self-sealing in at least some respects.

A still further object of my invention is to provide a trimmer potentiometer wherein the leadscrew is completely journaled in one portion of the casing to prevent the sealing of the composite parts of the casing at points adjacent the leadscrew.

A still further object of my invention is to provide a trimmer potentiometer wherein the leadscrew is mounted in a self lubricating bearing.

A still further object of my invention is to provide a trimmer potentiometer that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIGURE 1 is a side elevational view of my assembled device with a portion of the casing cut away to more fully illustrate its construction;

FIGURE 2 is a sectional view taken on line 2—2 of FIGURE 1;

FIGURE 3 is a top plan view of the lower case assembly;

FIGURE 4 is one end elevational view of the lower case assembly of FIGURE 3;

FIGURE 5 is a side elevational view of the lower case assembly shown in FIGURE 3 with a portion of the casing cut away to more fully show the construction thereof;

FIGURE 6 is a side elevational view of the top case assembly with a portion of the case cut away to more fully illustrate its construction;

FIGURE 14 is a perspective view of a different form of clip element;

FIGURE 15 is a partial sectional view of my device similar to that of FIGURE 13 but showing the use of the clip in FIGURE 14;

FIGURE 16 is a sectional view similar to that of FIGURE 12, but taken through a modified form of my invention; and FIGURE 17 is a sectional view similar to that of FIGURES 12 and 16, but taken through a second modified form of my invention.

Figure 12:
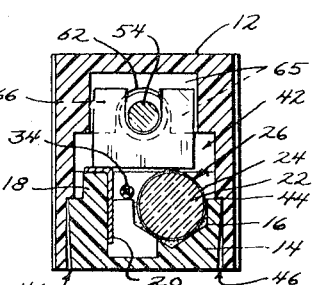
FIGURE 12 is a sectional view of my assembled device taken on line 12—12 of FIGURE 11.

I have used the numeral 10 to generally designate a housing comprised of a top case or casing 12 and a lower case or casing 14. The lower casing 14 is comprised of a normally horizontally disposed rectangular casing of plastic or the like with a flat bottom and side walls that taper upwardly and outwardly so that the top width thereof is greater than the width at the bottom thereof. The bottom and sides of lower casing 14 are clearly shown in FIGURES 2 and 12. An elongated depression 16 appears in the top and to one side of casing 14 and extends substantially the full length of the casing. As shown in FIGURE 12, depression 16 has vertical side walls which terminate in a V-shaped bottom portion. An elongated shoulder 18 protrudes from the top of lower casing 14 and extends in parallel fashion to depression 16. An inverted L-shaped collector bar 20, which is of electro-conducting material, is rigidly mounted on shoulder 18 in any convenient manner such as by a suitable adhesive. An elongated cylindrical core 22 with a plurality of windings 24 on its outer surface is held in depression 16 by a suitable adhesive, as shown in FIGURE 12. The V-shaped bottom of depression 16 permits the resistance coil 26, comprised of core 22 and windings 24, to be precisely aligned within casing 14 regardless of variations in the diameter thereof. The elevations of the tops of collector bar 20 and resistance coil 26 are substantially the same, as shown in FIGURE 12. Termination tabs 28 and 30 are secured to the opposite ends of resistance coil 26. A U-shaped raceway 38 is formed in one end of lower casing 14 as indicated in FIGURES 3 and 4, and flexible electrical leads 32, 34 and 36 extend into the casing from the exterior thereof. Lead 32 is secured to tab 28; lead 34 extends between the resistance coil 26 and collector bar 20 to be secured to tab 30, and lead 36 is secured to one end of the collector bar. Both ends of casing 14 terminate in a shelf 40 of reduced thickness.

Figure 7:
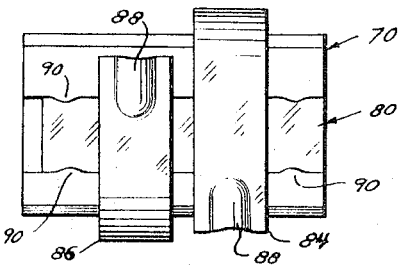
FIGURE 7 is a bottom plan view of the wiper arm assembly.
Figure 8:
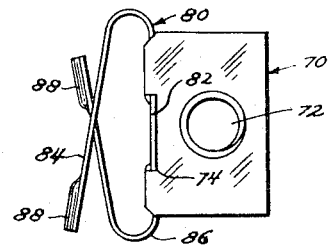
FIGURE 8 is an end view of the wiper arm assembly shown in FIGURE 7.
Figure 9:
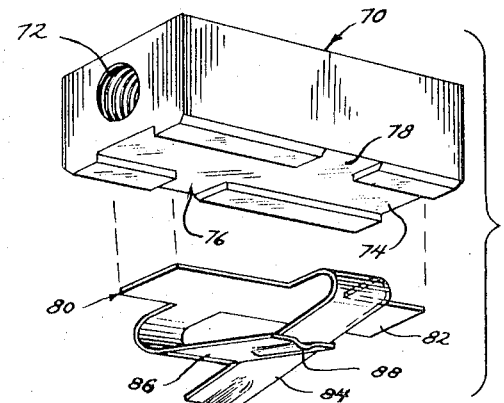
FIGURE 9 is a schematic perspective view of the wiper arm assembly showing how the wiper arms are assembled on the wiper block.
Figure 10:
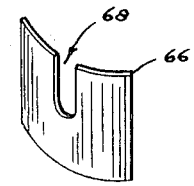
FIGURE 10 is a perspective view of a spring clip element used in sealing the assembled unit and to maintain the leadscrew against longitudinal displacement.
Figure 11:
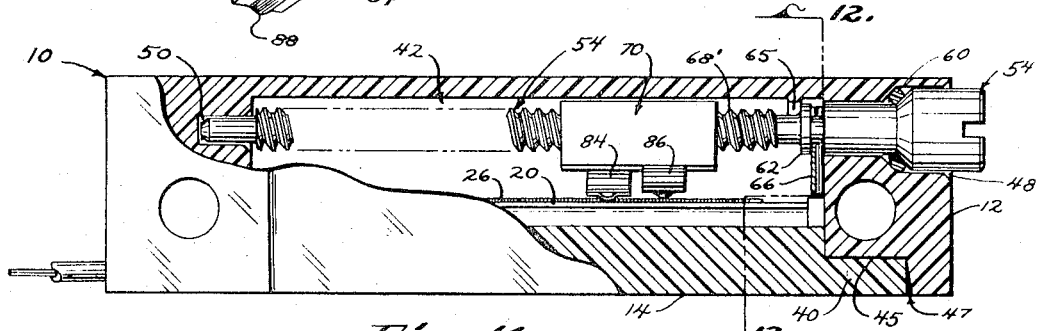
FIGURE 11 is an enlarged side elevational view of my assembled device similar to that of FIGURE 1 showing the screw assembly and related parts through a cut out portion of the upper and lower cases.

The top or upper casing 12 is rectangular in shape and has a compartment 42 which is partially complementary in shape to lower casing 14 so that the casing can be received within the compartment. A shoulder 44 appears along the vertical side walls of compartment 42 to engage the top of lower casing 14 to limit the penetration of the lower casing into the compartment. Shoulders 45 at the ends of casing 12 engage the shelves 40 on the ends of casing 14 to accomplish this same purpose. The bottoms of both the upper and lower casings thereupon appear in the same horizontal plane. Wedge-shaped openings 46 appear between the tapered sides of casing 14 and the vertical interior walls of compartment 42 and these openings are filled with a suitable adhesive when it is desired to permanently secure and seal the two casings 12 and 14 together. As shown in FIGURE 11, the portion of casing 12 adjacent the ends of casing 14 is tapered to present a wedge-shaped opening 47 into which a suitable adhesive can also be placed.

Figure 13:
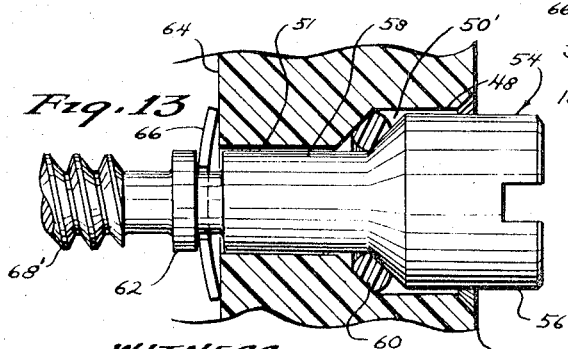
FIGURE 13 is an enlarged sectional view of one end of the screw assembly.

A horizontal bore 48 extends into one end of upper casing 12 and has a tapered portion 50' which terminates in horizontal bore 51, which, in turn communicates with the upper portion of compartment 42. A bore 50 is in axial alignment with bores 48 and 51 and is located in the other end of casing 12. A screw 54 extends through these bores and includes a head and shank 56 and 58 which are rotatably positioned in bores 48 and 50, respectively, and are complementary in shape to these bores. A resilient sealing ring 60 is mounted between the tapered portion of bore 48 and the corresponding tapered portion of head 56. The diameter of screw 54 decreases as it extends from the end of casing 12 into compartment 42. A shoulder 62 is formed on screw 54 in spaced relation to the end 64 of compartment 42, as shown in FIGURE 13. The inward side of shoulder 62 appears closely adjacent an arcuate protrusion 65 which extends downwardly over screw 54 from the top of compartment 42. This structure is shown in FIGURES 11 and 12. A resilient arcuate-shaped clip 66 with a screw receiving slot 68 has its vertical side edges in engagement with the end 64 of compartment 42. Clip 66 is forcibly positioned between the shoulder 62 on screw 54 and the end of the compartment as the screw is received in slot 68 of the clip. The confined space between the shoulder 62 and the end 64 of the compartment 42 causes clip 66 to be at least partially flattened when positioned in this space. The tendency of the clip to resume its normal arcuate position exerts an inward longitudinal force on the screw. This force causes sealing ring 60 to compress to help seal compartment 42. Also, this action not only prevents the inadvertent removal of the screw from the casing 12, but it also holds the screw against longitudinal "play." The remainder of screw is comprised of threaded portion 68' except for the extreme outer end thereof which is rotatably journaled in bore 50.

In FIGURES 14 and 15, I have shown an alternate form of clip 66A which may be of any desired shape, but which should have a slot 68A therein to receive screw 54. Clip 66A is generally flat but serves as a wedge between shoulder 62 and the end 64 of compartment 42 to compress sealing ring 60 in the same manner that clip 66 accomplished this result, namely, by exerting inwardly longitudinal pressure on the screw 54. Both of the clips 66 and 66A can be of a material having self-lubricating properties. Such a material is Otilite, but any such substance of powder metallurgy or the like will serve equally well.

A wiper block 70 has a threaded horizontal bore 72 which is adapted for threadable rotation on threaded portion 68' of screw 54. Wiper block 70 is generally rectangular in shape and is slidably mounted between the vertical walls at the top of compartment 42. An elongated recess 74 appears in the bottom of wiper block 70, which is comprised of plastic or the like, and recesses 76 and 78 extend at right angles thereto on opposite sides thereof. Recesses 76 and 78 are parallel but are not in alignment. A wiper assembly 80 of electro-conducting material is comprised of a single piece of material, and includes an elongated strip 82 with wiper arms 84 and 86 extending transversely therefrom on opposite sides thereof. Each arm is folded back upon itself and terminates in an arcuate contact surface area 88. Portions of wiper assembly 80 are complementary to the recesses in wiper block 70 and are received therein. The wiper block can be heat-treated so that beads or the like 90 will form to bind the wiper assembly to the block. As shown in FIGURES 2 and 11, the arcuate contact surface areas 88 on arms 84 and 86 are in resilient sliding engagement with collector bar 20 and resistance coil 26, respectively. The protrusion 65 near one end of screw 54 limits the longitudinal displacement of wiper block 70.

In FIGURE 16 I have shown a modified form of my device which is similar to the above described structure except for the collector bar structure and assembly. The original shoulder 18 is replaced by a shoulder 18A which has an elongated V-shaped groove 16A therein similar in cross section and parallel to the depression or groove 16 which houses the resistance coil 26. Original collector bar 20 is replaced by hollow cylindrical or tubular collector bar 20A which is held in groove 16A by a suitable adhesive. In this form of my invention, lead 34 is permitted to pass through the center of the collector bar 20A. This structure serves to conserve space, and the parallel grooves 16A and 16 insure that the collector bar 20A and resistance coil 26 will always be aligned.

The form of the invention shown in FIGURE 17 is similar to that of FIGURE 16 but the collector bar 20B thereof is a solid cylindrical rod. The cylindrical shape of collector bars 20A and 20B provide a better contact surface and is less likely to become coated with dirt or debris. Furthermore, ease of fabrication of the bars and assembly in the grooves 16A is achieved by this cylindrical construction.

The normal operation of my device is as follows: The resistance imparted to the elecrtical circuitry associated with my trimmer potentiometer is determined in the conventional manner by rotating the screw 54 to alter the position of the wiper block 70 and the wiper arm 86 with respect to the resistance coil 26. My unit permits the assembly of the screw 54 and the related wiper block 70 and wiper assembly 80 to be assembled in large quantities independently of the rest of the potentiometer. The sealing and connecting characteristics of the clips 66 and 66A in regard to screw 54 and the upper casing 12 have already been discussed, but it should be noted that since no seam in housing 10 occurs along the longitudinal axis of screw 54, the difficult task of creating such a seal is avoided.

The resistance coil 26 can be wound to any desired specification and placed in the V-shaped bottom portion of depression 16 and can be rigidly secured therein by a suitable adhesive. The tapered walls of the bottom of depression engage and align the resistance coil regardless of its diameter.

The assembled lower casing 14 can then be positioned in the assembled upper casing 12 as shown in FIGURE 12. The two casings can be temporarily held together by any convenient external means, and the potentiometer can then be tested to insure the operability thereof. If any malfunctions are noted during testing, the two casings, not yet having been permanently united, and then be separated and repaired, or if one assembly is totally defective, the other assembly can normally be salvaged and matched with a substituted casing.

Substantial production costs are saved by creating the wiper assembly 80 from a single piece of metal which provides both the wiper arm 84 for the collector bar 20 and the wiper arm 86 for the resistance coil 26. These fabrication costs are further reduced by the means of securing the wiper assembly 80 to the wiper block 70. The recesses 74, 76 and 78 stabilize the wiper assembly 80 and the subsequently formed beads 90 lock the assembly to the block. Beneficial spring action is afforded each of the wiper arms 84 and 86 by bending them substantially 180 degrees from each side of the wiper block 70, and permitting them to extend back substantially to the opposite side of the wiper block. This spring action which is built into each of the wiper arms helps to insure a constant positive contact with the collector bar 20 (or collector bars 20A or 20B) and the resistance coil 26. The arcuate contact surfaces 88 on each of the arms 84 and 86 provide an adequate surface while at the same time, wear on the resistance coil and collector bar is minimized. The accumulation of "debris" by the collector arms is also minimized by these arcuate contact surfaces, particularly when used on the collector bars 20A or 20B. Since both of the arms 84 and 86 extend laterally from block 70, they do not shorten or limit the longitudinal displacement of the block on screw 54.

After the potentiometer has been assembled and successfully tested, a suitable adhesive is then placed in the wedge-shaped openings that separate the two casings 12 and 14. A suitable adhesive or sealing substance (not shown) is placed around leads 32, 34 and 36 in raceway 38, and with sealing ring 60 sealing the tapered portion of bore 48, the housing 10 is effectively sealed.

Thus, from the foregoing, it is seen that my device will accomplish at least all of its stated objectives.

Some changes may be made in construction and arrangement of my trimmer potentiometer without departing from the real spirit and purpose of my invention, and it is my intention to cover by my claims, any modified forms of structure or use of mechanical equivalents which may be reasonably included within their scope.

I claim:
1. In a potentiometer,
a housing,
a bearing means in said housing,
a leadscrew of integral solid construction rotatably secured in said bearing means, said leadscrew having at least limited longitudinal movement in said bearing means,
a resistance coil secured in said housing,
a collector bar secured in said housing,
wiper contact means movably mounted on said leadscrew and in engagement with said collector bar and said resistance coil,
a bore in said housing and communicating with the exterior thereof,
one end of said leadscrew extending into said bore,
at least a portion of said leadscrew and said bore having closely adjacent opposing surfaces diagonally disposed with respect to the longitudinal axis of said bore,
the diagonally disposed opposing surface of said leadscrew comprising a portion of its length wherein its diameter is progressively decreased from a head portion of larger diameter to a center portion of reduced diameter,
a resilient sealing means intermediate the adjacent opposing surfaces of said leadscrew and said bore,
retaining means on said leadscrew urging said leadscrew in one direction of longitudinal movement to move the opposing surfaces of said leadscrew and said bore together to compress said sealing means,
and electrical connecting means on said collector bar and said resistance coil for connecting said potentiometer in an electrical circuit.

2. The structure of claim 1 wherein said sealing means is a ring of resilient material.

3. The structure of claim 1 wherein the retaining means on said leadscrew includes a shoulder rigidly secured to said leadscrew and loosely positioned between two spaced apart projections on said housing, and a clip on said leadscrew forcibly urging said shoulder into abutting relation with one of said projections on said housing.

4. The structure of claim 3 wherein said clip is comprised of a resilient material.

5. The structure of claim 3 wherein said clip is resilient and arcuate in shape and is partially compressed towards a flattened condition between said shoulder and one of said projections.

6. The structure of claim 3 wherein said clip is substantially flat and is forcibly wedged between said shoulder and one of said projections.

7. In a potentiometer,
a housing having
a leadscrew rotatably secured in said housing,
a resistance coil secured in said housing,
a collector bar secured in said housing,
wiper contact means movably mounted on said leadscrew and in engagement with said collector bar and said resistance coil,
a bore in said housing and communicating with the exterior thereof,
one end of said leadscrew extending into said bore,
at least a portion of said leadscrew and said bore having closely adjacent opposing surfaces diagonally disposed with respect to the longitudinal axis of said bore and said leadscrew,
the diagonally disposed opposing surface of said leadscrew comprising a portion of its length wherein its diameter is progressively decreased from a head portion of larger diameter to a center portion of reduced diameter,
a resilient sealing means intermediate the adjacent opposing surfaces of said leadscrew and said bore,
a shoulder means rigidly secured to said leadscrew and being positioned in said housing adjacent the portion of said housing adjacent the inner end of said bore,
a resilient arcuate clip on said leadscrew and in engagement with said shoulder and the portion of said housing adjacent the inner end of said bore wherein said clip is partially compressed towards a flattened condition between said shoulder and the portion of said housing adjacent the inner end of said bore; and said resilient sealing means is partially compressed between the diagonally disposed surfaces in said bore and on said leadscrew to effect a tight seal of said housing even when said sealing means becomes worn through repeated rotation of said leadscrew;
said clip maintaining a constant compression on said sealing means and moving said leadscrew and the opposing surface thereon towards the opposing surface of said bore to continue to compress said sealing means even when said sealing means becomes worn through repeated rotation of said leadscrew,
an electrical connecting means on said collector bar and said resistance coil for connecting said potentiometer in an electrical circuit.

References Cited by the Examiner

UNITED STATES PATENTS

| | | | |
|---|---|---|---|
| 472,288 | 4/1892 | Edison | 277—115 X |
| 2,895,116 | 7/1959 | Morrison | 338—180 |
| 2,934,733 | 4/1960 | Green et al. | 338—148 |
| 2,958,062 | 10/1960 | Barden et al. | 338—180 |
| 2,976,507 | 3/1961 | Di Girolamoa et al. | 338—180 |
| 3,050,704 | 8/1962 | Dickinson et al. | 338—180 |

ANTHONY BARTIS, *Primary Examiner.*